(12) United States Patent
Wethington

(10) Patent No.: US 6,304,591 B1
(45) Date of Patent: Oct. 16, 2001

(54) MATCH FILTER ARCHITECTURE BASED UPON PARALLEL I/O

(75) Inventor: Carin Wethington, Forest Knolls, CA (US)

(73) Assignee: ALOHA Networks, Inc., San Francisco, CA (US)

( * ) Notice: Subject to any disclaimer, the term of this patent is extended or adjusted under 35 U.S.C. 154(b) by 0 days.

(21) Appl. No.: 09/350,135

(22) Filed: Jul. 9, 1999

Related U.S. Application Data

(60) Provisional application No. 60/092,451, filed on Jul. 10, 1998.

(51) Int. Cl.[7] .............................. H04K 1/00; G06F 15/31
(52) U.S. Cl. ........................... 375/152; 708/301; 708/314
(58) Field of Search ................................... 375/152, 350, 375/343; 708/300, 301, 314

(56) References Cited

U.S. PATENT DOCUMENTS

| | | | |
|---|---|---|---|
| 3,623,104 | * 11/1971 | Nikolas et al. | 375/152 |
| 3,665,171 | * 5/1972 | Morrow | 340/15.5 |
| 3,912,917 | * 10/1975 | Nussbaumer | 708/300 |
| 4,012,628 | 3/1977 | Gersho . | |
| 4,550,414 | 10/1985 | Guinon et al. . | |
| 4,569,031 | * 2/1986 | Backes | 708/300 |
| 4,583,231 | 4/1986 | Puckette . | |
| 4,707,839 | 11/1987 | Andren et al. . | |
| 5,031,133 | * 7/1991 | Sasaki | 708/300 |
| 5,060,180 | * 10/1991 | Kingston et al. | 708/314 |
| 5,450,339 | * 9/1995 | Chester et al. | 708/300 |
| 5,471,504 | 11/1995 | Lee et al. . | |
| 5,663,983 | 9/1997 | Lin . | |
| 5,673,286 | 9/1997 | Lomp . | |
| 5,680,414 | 10/1997 | Durrant et al. . | |
| 5,715,276 | 2/1998 | Tran et al. . | |
| 5,719,900 | 2/1998 | Dixon et al. . | |

OTHER PUBLICATIONS

IBM Technical Disclosure Bulletin, "Gate–Savings Approach to a Multi–Bit Correlator for a Spread Spectrum Communications System," vol. 38, No. 6, Jun. 1995, pp. 653–656.

* cited by examiner

Primary Examiner—Temesghen Ghebretinsae
(74) Attorney, Agent, or Firm—James Creighton Wray; Meera P. Narasimhan

(57) ABSTRACT

The present invention is a match filter architecture that is used in the Spread ALOHA Multiple Access (SAMA) receiver to facilitate the separation of individual user's data from the incoming SAMA sample "chip" stream. The filter outputs the convolution of the incoming signals with the matched filter impulse response at the same rate as the sampling of incoming chips, thus providing a means to detect more than one user within one match pattern interval. The filter operates completely synchronously with a high frequency filter clock, which is used to generate the sample clock. Incoming chip samples are loaded in the delay shift register at the sample clock rate. The samples are shifted at the filter clock frequency. Each bit in the chip trickles down through serial adders, with one clock period of delay for each serial adder. At the final accumulator, the serial sum bits are collected for parallel presentation to output registers at the sampling frequency.

15 Claims, 1 Drawing Sheet

MATCH FILTER ARCHITECTURE BASED UPON PARALLEL I/O

BACKGROUND OF THE INVENTION

This application claims the benefit of U.S. Provisional Application No. 60/092,451, filed Jul. 10, 1998.

SUMMARY OF THE INVENTION

The present invention is a match filter architecture that is used in the Spread ALOHA Multiple Access (SAMA) receiver to facilitate the separation of individual user's data from the incoming SAMA sample "chips" stream. The disclosures of U.S. Pat. Nos. 5,537,397 and 5,745,485 are hereby incorporated by reference.

The filter architecture is suitable for any digital filter with coefficients that are restricted to 0, +1, or −1. This filter architecture uses much less silicon and power than a comparable filter implemented in the conventional manner.

This filter architecture supports a very large number of taps by using a combined serial/parallel approach. It may operate at high speed and may be implemented with fewer gates than a typical filter design. Unlike a correlater, this filter outputs the convolution of the incoming signal with the coefficients at the same rate as the incoming chip samples, thus providing a means to detect more than one user within one pseudo-noise pattern interval.

The filter coefficients are limited to +/−1 or 0. The +/−1 filter coefficient taps correspond to the match code, typically a pseudo-noise code, and the 0-coefficient filter taps are placed in between the +/−1 taps to correspond to the over-sampling of the incoming signal.

The filter operates completely synchronously with a high frequency clock, which produces a high frequency signal. The clock is used to generate the sample (or chip) clock signal for control and synchronization of the sampling, the adding and the parallel output. The incoming chip samples from the parallel sample inputs are loaded into the delay shift register at the sample clock rate. The samples in the shift register are shifted to the right at the filter clock frequency at multiples of the sample rate. Each bit in the chip trickles down through the serial adders with one accumulator shift clock period of delay for each serial adder. At the final accumulator, the serial sum bits are collected for parallel presentation to the output registers at the sampling frequency. This approach works for any result where the number of bits in the output is less than or equal to the filter clock divided by the sample clock.

In the example shown, the bits in the shift register are shifted at a high frequency clock rate that is two (2) times the sampling rate. The serial adders operate at an accumulator shift rate that is a multiple of the sampling rate. Bits in the accumulator are shifted at the accumulator shift rate, and the convolution data in the accumulator is outputted at the sample rate.

These and further and other objects and features of the invention are apparent in the disclosure, which includes the above and ongoing written specification, with the claims and the drawings.

DETAILED DESCRIPTION OF THE PREFERRED EMBODIMENT

Figure 1:
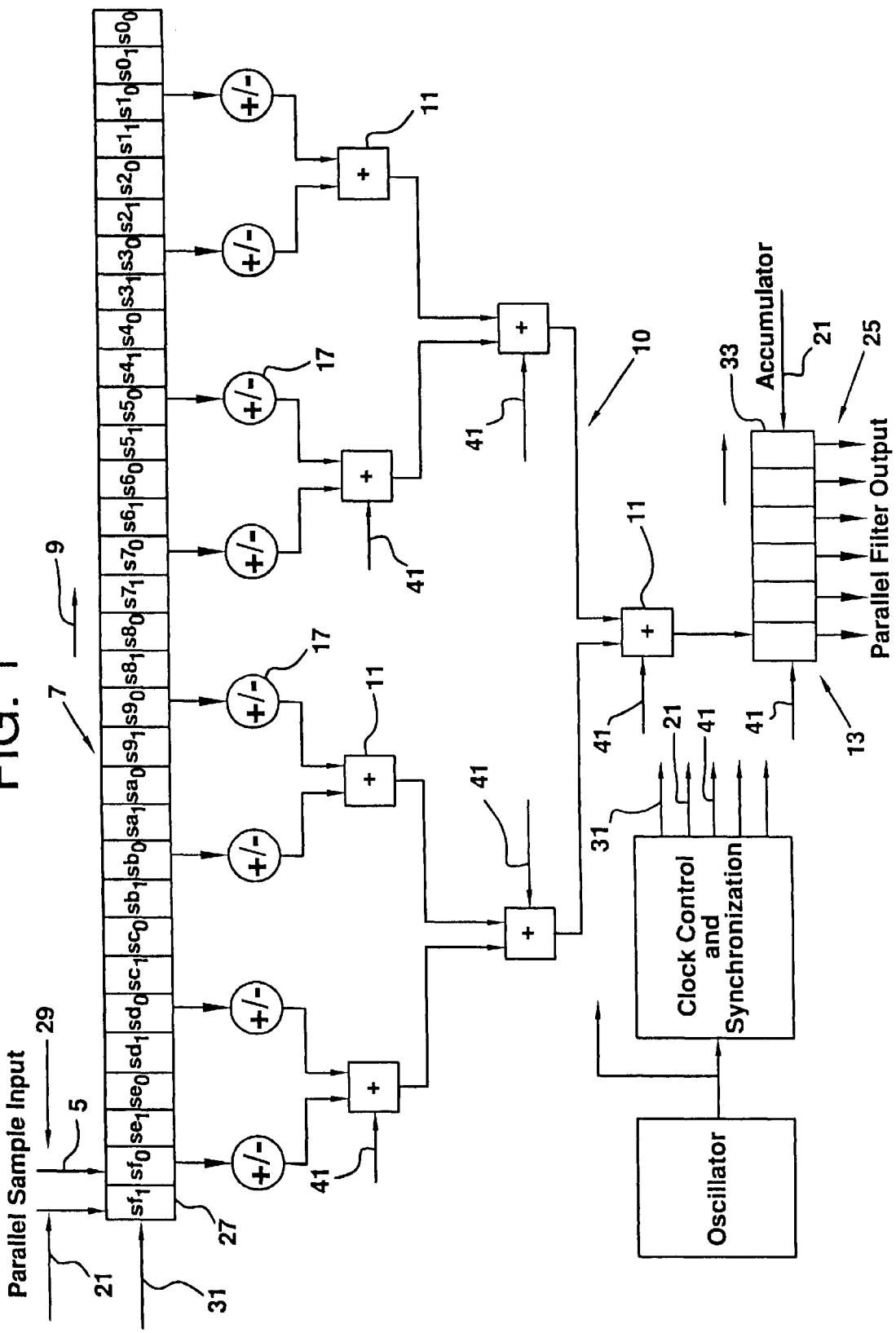
FIG. 1 is a block diagram of the new match filter architecture.

The present invention is a match filter architecture that is used in the Spread ALOHA Multiple Access (SAMA) receiver to facilitate the separation of individual user's data from the incoming SAMA sample "chip" stream. This filter architecture uses much less silicon and power than a comparable filter implemented in the conventional manner.

This filter architecture may support a very large number of taps by using a combined serial/parallel approach. It may operate at high speed, and may be implemented with fewer gates than a typical filter design. Unlike a correlator, this filter outputs the correlation of the incoming signal with the signal at the same rate as the incoming chip samples, thus providing a means to detect more than one user within one pattern interval.

The filter coefficients are limited to +/−1 or 0. The +/−1 filter coefficient taps (FIG. 1) correspond to the matched code, and the 0-coefficient filter taps are placed in between the +/−1 taps to correspond to the over-sampling of the incoming signal. FIG. 1 shows a block diagram for a match filter architecture.

The filter 10 operates completely synchronously with a high frequency clock 3, which produces other synchronization and control signals 31. The clock 3 is used to generate the sample clock signal 21 and the accumulator clock signal 41 for control and synchronization of the sampling 29, the shifting 9, the adding 11 and the parallel output 25. The incoming chip samples 5 from the parallel sample inputs 29 are loaded into the delay shift register 7 at the sample clock rate 21. The chip samples 27 in shift register 7 are shifted 9 to the right at the filter clock frequency 31 at multiples of the sample clock rate 21. Each bit 27 in the chip trickles from spaced shift register positions through +/− filters 17 and down through the serial adders 11, with one accumulator shift clock period 41 of delay for each serial adder. At the final accumulator 13, the serial sum bits 33 are shifted and collected at the accumulator clock rate for parallel presentation 25 to the output registers at the sampling clock rate frequency. This approach works for any result where the number of bits in the output is less than or equal to the filter clock divided by the sample clock.

In the example shown, the bits 27 in the shift register 7 are shifted at high frequency filter clock rate 31 at two (2) times the sampling rate 21. The serial adders 11 operate at an accumulator shift rate 41 that is a multiple of the sampling rate 21. Bits 33 in the accumulator 13 are shifted at the accumulator shift rate 41, and the convolution data in the accumulator is output at the sample rate 21.

While the invention has been described with reference to specific embodiments, modifications and variations of the invention may be constructed without departing from the scope of the invention, which is defined in the following claims.

We claim:

1. A filtering apparatus, comprising;

a delay shift register having parallel inputs for receiving incoming chip samples;

a clock connected to the delay shift register inputs for controlling and synchronizing the incoming chip samples at a sample rate and shifting chip samples in the delay shift register at a high frequency clock rate;

a plurality of spaced taps in the delay shift register for receiving the chip samples from the delay shift register;

a plurality of serial adders having inputs connected to spaced taps for receiving the chip samples from the plurality of taps; and an accumulator for receiving output samples from the plurality of serial adders, collecting and storing the outputs as chip samples and outputting the chip samples in parallel presentations.

2. The apparatus of claim 1, wherein the clock is a high frequency clock having a high frequency filter clock rate output connected to the delay shift register having an intermediate accumulator clock rate output connected to the serial adders and to the accumulator for adding chip signals in the serial adders and storing sums of chip signals in the accumulator and having a sample rate clock output connected to the delay shift register inputs for controlling inputs and connected to the accumulator for controlling the chip sample parallel presentations.

3. The apparatus of claim 1, wherein the plurality of taps further comprise a plurality of +/−1 coefficient taps and a plurality of 0 coefficient taps.

4. The apparatus of claim 3, wherein one or more 0 coefficient taps is located between a pair of +/−1 coefficient taps.

5. The apparatus of claim 4, wherein the plurality of serial adders further comprises a plurality of parallel adders having inputs connected to spaced 0 taps, intermediate adders having inputs connected to outputs of a first parallel adder and an output adder having inputs connected to outputs of the intermediate adders and having an output connected to an input of the accumulator.

6. A method of filtering a signal, comprising the steps of:

receiving incoming sampled signals on parallel inputs;

storing the incoming samples from the parallel sample inputs;

generating a sample clock rate for controlling and synchronizing the sampling;

controlling the sampling at a sample clock rate and having a sample clock rate output connected to a delay shift register inputs for controlling sampling of the signals at the inputs and connected to an accumulator for controlling the chip sample parallel presentations;

loading the samples into a delay shift register at the sample clock rate;

generating a higher filter clock frequency synchronized with the sample clock rate;

shifting the samples in the delay shift register at the filter clock frequency;

shifting plural chip samples in the register through a plurality of taps;

generating an accumulator clock rate conducting the chip samples from a plurality of spaced taps to a plurality of serial adders;

adding the chip samples in the serial adders at the accumulator clock rate;

outputting serially added sums from the plurality of serial adders to an accumulator;

collecting and sequentially storing the serially added sums in parallel within the accumulator;

outputting the samples in parallel presentations from the accumulator to a plurality of output registers.

7. The method of claim 6, wherein adding the chip samples further comprises delaying the samples one period of the clock rate.

8. The method of claim 7, wherein the outputting the chip samples comprises outputting the chip samples at the sample rate.

9. The method of claim 6, wherein the receiving the samples and the outputting the samples comprises receiving the samples and outputting the samples at the same rate.

10. The method of claim 6, wherein the generating a filter clock signal comprises generating a high frequency signal and wherein generating an accumulator clock rate comprises generating an accumulator clock at an intermediate rate between the filter clock rate and the sampling clock rate.

11. The method of claim 6, wherein generating the filter clock frequency comprises generating a filter clock frequency that is a multiple of the sample clock rate.

12. The method of claim 6, wherein conducting the chip samples from the delay shift register coefficient from a plurality of spaced taps comprises providing a plurality of +/−1 coefficient taps and a plurality of 0 coefficient taps and conducting the chip samples from the spaced 0 coefficient taps.

13. A filter comprising a clock control for producing a sample clock rate and an accumulator clock rate, a high frequency filter clock rate and for synchronization for the clock rates, a delay shift resister having plural +/−1 filter coefficient taps corresponding to a matched code and having plural 0 coefficient taps placed between the +/−1 taps for corresponding to over sampling of incoming signals, parallel inputs connected to the input of the delay shift register, a sample clock rate connection to the parallel inputs for inputting incoming signal samples at the sample clock rate, a filter clock rate connection to the delay shift register for shifting samples in the register at the high frequency filter clock rate, plural serial adders having inputs and outputs and further comprising first adders with inputs connected to spaced taps of the shift register, intermediate adders with inputs connected to outputs of first adders and an output adder with inputs connected to outputs of intermediate adders and having an output, accumulator clock rate connections to the adders for synchronizing the adders, an accumulator having an input connected to an output of the output adder, an accumulator clock connection to the accumulator for storing sequential sum bits from the output of the output adder in the accumulator at the accumulator clock rate, and a sample clock connection to the accumulator for parallel presentation of the stored serial sum bits to output registers at the sample clock rate.

14. The filter of claim 13, wherein the inputs of the first adders are connected to the spaced +/−1 coefficient taps in the delay shift register.

15. The filter of claim 14, further comprising +/−1 coefficient taps connected between the spaced 0 coefficient taps and the inputs of the first adders.

* * * * *